(12) United States Patent
Wright, III et al.

(10) Patent No.: US 7,796,641 B2
(45) Date of Patent: Sep. 14, 2010

(54) METHOD, COMPUTER PROGRAM PRODUCT, AND APPARATUS FOR PROVIDING A UNIVERSAL HIGH SPEED LINK FOR OPERATION SUPPORT SYSTEM DATA

(75) Inventors: Stephen L. Wright, III, Suffolk, VA (US); Charles H. Ridgely, Virginia Beach, VA (US)

(73) Assignee: Verizon Services Corp., Ashburn, VA (US)

( * ) Notice: Subject to any disclaimer, the term of this patent is extended or adjusted under 35 U.S.C. 154(b) by 558 days.

(21) Appl. No.: 11/618,153

(22) Filed: Dec. 29, 2006

(65) Prior Publication Data

US 2008/0159329 A1 Jul. 3, 2008

(51) Int. Cl.
*H04J 3/16* (2006.01)
(52) U.S. Cl. .................................... 370/466
(58) Field of Classification Search ................. 370/401, 370/465–466
See application file for complete search history.

(56) References Cited

U.S. PATENT DOCUMENTS

| | | | | |
|---|---|---|---|---|
| 5,317,742 | A * | 5/1994 | Bapat | 707/3 |
| 6,118,766 | A * | 9/2000 | Akers | 370/249 |
| 7,139,387 | B2 * | 11/2006 | Dahari | 379/229 |
| 7,260,078 | B1 * | 8/2007 | Ledsham et al. | 370/338 |
| 2006/0195613 | A1 * | 8/2006 | Aizu et al. | 709/246 |
| 2007/0201367 | A1 * | 8/2007 | Chen et al. | 370/235 |

\* cited by examiner

*Primary Examiner*—Frank Duong

(57) ABSTRACT

An apparatus for providing a universal high speed link for operation support system data may include a processing element, a protocol determining element and a protocol translation element. The processing element may be configured to receive operation support system data from a first device of a first network in a first protocol. The protocol determining element may be configured to determine a protocol translation for the operation support system data. The protocol translation element may be configured to translate the operation support system data from the first protocol to a second protocol responsive to the determination. The processing element may be in communication with both the protocol determining element and the protocol translation element. The processing element may be configured to communicate the operation support system data to a second device of a second network in the second protocol at a data rate greater than about 320 kilobytes per second.

23 Claims, 3 Drawing Sheets

METHOD, COMPUTER PROGRAM PRODUCT, AND APPARATUS FOR PROVIDING A UNIVERSAL HIGH SPEED LINK FOR OPERATION SUPPORT SYSTEM DATA

BACKGROUND INFORMATION

Network service providers often receive data from or send data to a network, which may be a public switched telephone network (PSTN), a wireless network, the Internet, etc., in order to communicate operational support system (OSS) data. For example, data collection devices or computers of the network service provider's local network may desire to send and/or receive OSS data via a switch or some other network element of the network. The OSS data may relate, for example, to maintenance operations for equipment on the network that is associated with the network service provider or to billing record data such as Automatic Message Accounting (AMA) data. In a typical situation, the service provider may perform the maintenance operations though discrete operations conducted via dial up connections that provide relatively low speed data transfer rates. Meanwhile, billing record data such as AMA data may be very voluminous such that long or near continuous downloading of such information may be performed, thereby making any downtime relatively difficult to recover from.

In an effort to reduce the above difficulties, some solutions have been developed to increase data transfer rates for certain types of OSS data by providing higher speed modems. However, such solutions may be highly proprietary and inflexible.

BRIEF DESCRIPTION OF THE SEVERAL VIEWS OF THE DRAWING(S)

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. More particularly, implementations of certain embodiments may take the form of web-implemented computer software. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Embodiments may provide a universal high speed link for communication of OSS data between, for example, any type of network element including various types of network switches and devices of a local network. As such, embodiments may provide translation and/or mediation between dissimilar protocols for the communication of numerous types of OSS data to any type of network element.

Figure 1:
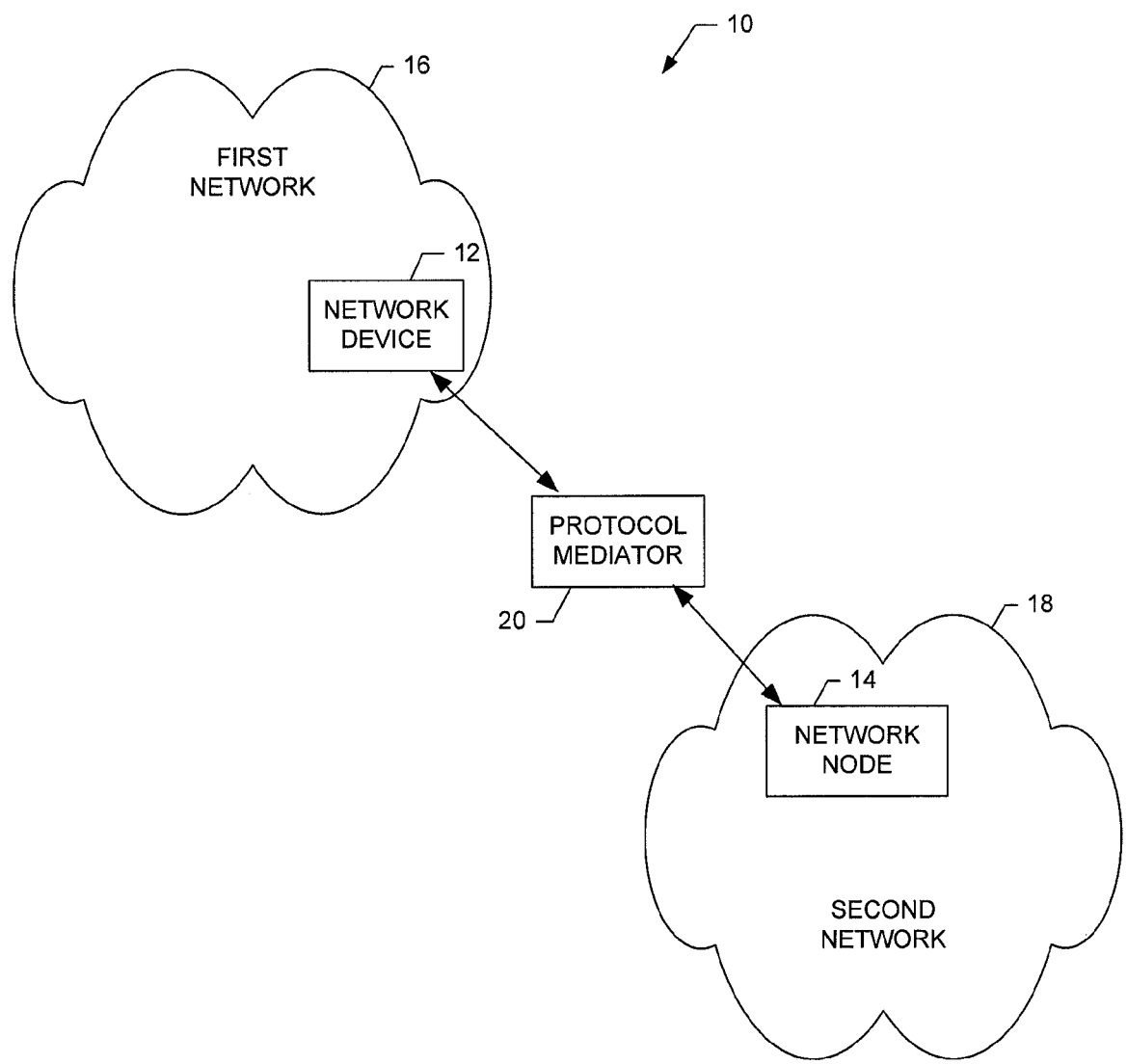
FIG. 1 is a block diagram of a system for providing universal high speed operation support system data communication according to an exemplary embodiment.

FIG. 1 shows a block diagram of a system 10 for providing universal high speed OSS data communication according to an exemplary embodiment. The system may include a network element 12, which may be a network device of a first network 16 such as a public network, a network node 14 which may be a device of a second network 18 such as a private network, and a protocol mediator 20 which may provide communication between the network element 12 and the network node 14. In an exemplary embodiment, the network element 12 may be, for example, a network device of a communication network such as a PSTN. As such the network element 12 could be any one of a number of switching systems or elements. In an exemplary embodiment, the network element 12 could be any one of numerous switching elements such as, for example, a class 5 electronic switching system (5ESS) made by Lucent Technologies, a Nortel DMS 100, a Nortel soft switch, a Lucent DTT5 switch, a voice mail platform, a Siemens EWSD digital switch, etc. Accordingly, the protocol mediator 20 may be configured for communicating with any type of network element or switch regardless of the network element's manufacturer. The network node 14 may be a device of an IP network such as, for example, a company or another entity's local area network (LAN).

In various exemplary embodiments, the network node 14 may be embodied as a data collection device such as a computer or application configured to collect a particular type of data, or a maintenance device such as a computer or application configured to communicate with the network element 12 in order to perform maintenance operations with respect to elements of the first network 16. In this regard, it should be understood that the first network 16 may include a plurality of other network elements, each of which may provide various functions or data which may desirably be accessed or otherwise interfaced with by an operator within the second network. Accordingly, the operator may issue requests and/or commands via the network node 14 and the protocol mediator 20 may provide corresponding translation of the requests and/or commands for communication of the requests and/or commands to the respective other network elements via the network element 12, which may be a switching system configured to enable access or communication with the other network elements.

It should be noted that although FIG. 1 shows only one network element 12 and one network node 14, the protocol mediator 20 may be configured to provide communication between one or more network elements and corresponding one or more network nodes. Thus, FIG. 1 is merely provided by way of example and not of limitation so that a simple embodiment may be explained for purposes of clarity.

The protocol mediator 20 may be configured to translate OSS related data and/or messages between various protocols that may be utilized for communication with the network element 12 for each particular type of OSS data and/or message and the protocol of the second network such as IP. In this regard, OSS data may include automatic message accounting (AMA) data which is used for reporting telephone calls within a telephone system, SCANS data which used for the installation of patches and updates to switches on an as needed bases, MARCH data which provides recent changes such as new telephone lines into switches, mechanized loop test (MLT) data which is used to test circuit continuity to a particular location, E2A telemetry data which is used to scan and review alarms, etc.

Each of the different types of OSS data may be associated with a particular application, device or element of the first network 16 with which communication is provided by the network element 12. Accordingly, since the network node 14 of the second network 18 may have a fixed protocol such as IP, the protocol mediator 20 may be configured to provide translation/mediation between any of a plurality of different protocols in order to enable communication between devices and/or applications of the second network 18 having a first protocol with devices and/or applications of the first network 16 having any one of a plurality of protocols which may be different protocols from the first protocol. As such, for example, the protocol mediator 20 may be any device or means embodied in either hardware, software, or a combination of hardware and software configured to translate data and/or messages from the first network 16, which may be in any of a plurality of different protocols to the first protocol such as IP, and to translate data and/or messages from the second network 18 in the first protocol to a corresponding one of the plurality of different protocols based on the type of OSS data and/or message.

Furthermore, the protocol mediator 20 may be configured to provide high speed data rates for such communication (e.g., rates greater than 320 kilobytes per second). In this regard, whereas a device such as an ISDN may typically provide data communication for OSS data between a network element of one network and a network node of a different network, the ISDN provides notoriously slow data rates as compared to the high speed data rates provided by the protocol mediator 20 (e.g., 128 kilobytes per second). Additionally, although certain high speed modems such have been configured to provide high speed communication between a network element of one network and a network node of a different network, such high speed modems may only be configured to support communication with a single type of switching system via a particular type of protocol. In other words, such high speed modems are typically hardwired to support only a specifically defined type of OSS data. To the contrary, the protocol mediator 20 may be configured to provide universal communication between a network element of one network and a network node of a different network. In this regard, the protocol mediator 20 may be configured to enable communication with any type of network element regardless of the network element's manufacturer or origin. The protocol mediator 20 may further be configured to support communication of a plurality of types of OSS data, thereby providing corresponding translations between a plurality of protocols such as, for example, IP and a protocol associated with the particular type of OSS data being communicated.

In an exemplary embodiment in which the OSS data may be AMA data, the network node 14 may be a device or application configured to collect AMA data from the network element 12 of the first network 16. As such, in this example, the network element 12 may be a 5ESS switch providing access to AMA billing records from a device of the first network 16 and the network node 14 may be an AMA data center collection application. Accordingly, the network node 14 may issue an AMA request, e.g., in IP, to the protocol mediator 20 for communication to the network element 12. The protocol mediator 20 may translate the AMA request into a corresponding protocol to enable the AMA request to be understood by a corresponding device of the first network 16 which may be accessed via the network element 12 (e.g., a 5ESS switch). For example, the corresponding protocol may be BX25. Upon receipt of the AMA request at a device of the first network, the network element 12 may communicate AMA data to the protocol mediator 20, for example, in the BX25 protocol. The protocol mediator 20 may translate the AMA data to IP for communication of the AMA data to the network node 14 in fulfillment of the AMA request.

In another exemplary embodiment in which the OSS data may be SCANS related data. As such, the network node 14 may be a device or application configured to issue SCANS related updates or patches to network switches of the first network 16 via the network element 12. Thus, for example, an operator may issue a patch or update in IP which may be received at the protocol mediator 20. In response to receipt of the patch or update, the protocol mediator 20 may be configured to determine a corresponding translation to be performed based on either the type of data or based on an address or identifier of the device of the first network 16 which is to receive the patch or update. The protocol mediator 20 may perform the determined corresponding translation and communicate the patch or update to the device of the first network 16 which is to receive the patch or update via the network element 12. The network element 12 may then receive a response from the device of the first network 16 which is to receive the patch or update and communicate the response to the protocol mediator 20 which may translate the response for communication to the network node 14.

Figure 2:
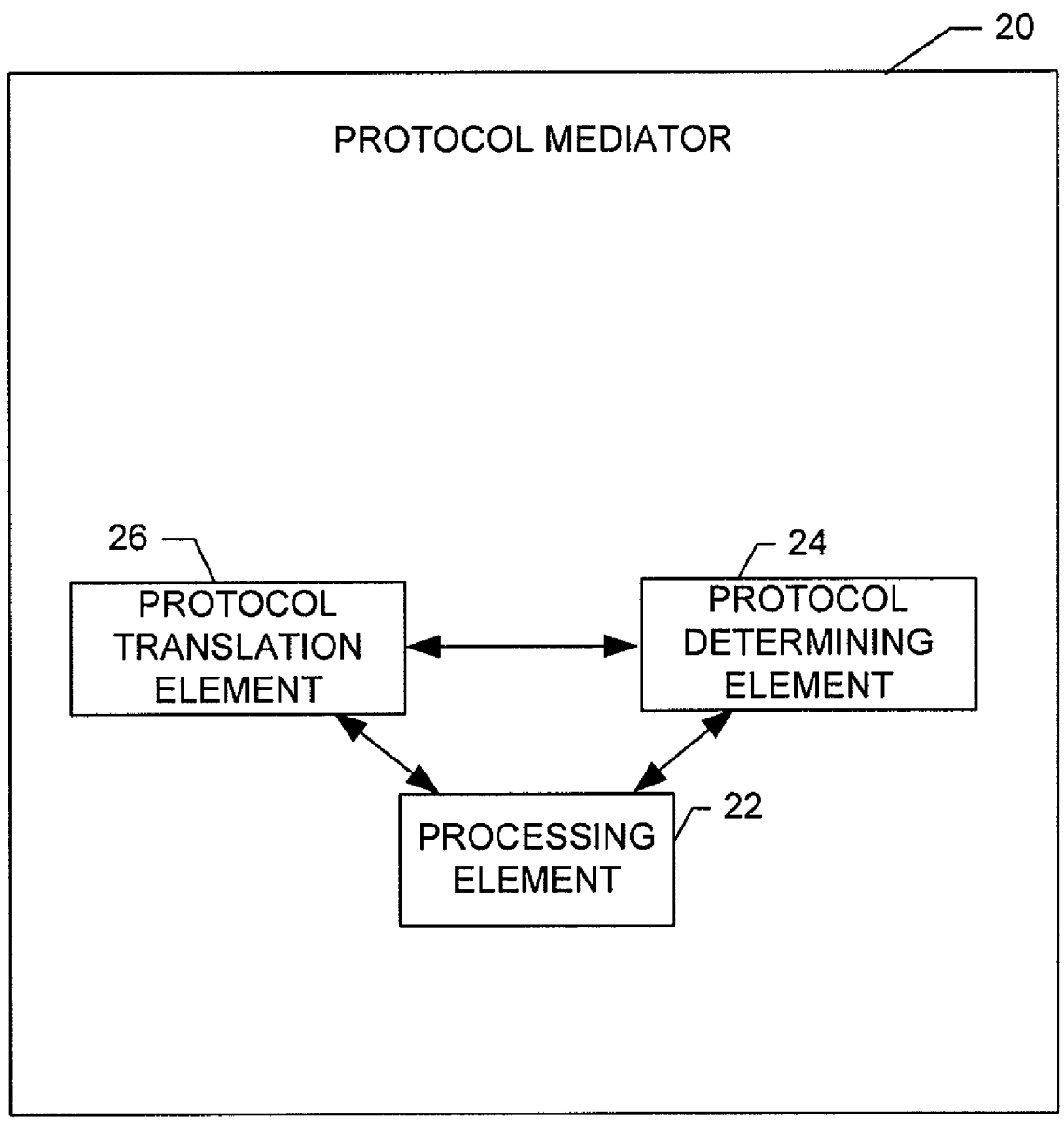
FIG. 2 illustrates a protocol mediator according to an exemplary embodiment.

FIG. 2 illustrates the protocol mediator 20 according to an exemplary embodiment. In this regard, as shown in FIG. 2, the protocol mediator 20 may include, or otherwise be in communication with a processing element 22, a protocol determining element 24 and a protocol translation element 26. In an exemplary embodiment, the protocol mediator 20 could be embodied as the processing element 22. As such, the processing element 22 may be configured to control other elements of the protocol mediator 20, or may be configured itself to perform the corresponding functions associated with the other elements of the protocol mediator 20. In this regard, a processing element such as described herein may be embodied in many ways. For example, the processing element 22 may be embodied as a processor, a coprocessor, a controller or various other processing means or devices including integrated circuits such as, for example, an ASIC (application specific integrated circuit).

The protocol determining element 24 may be any device or means embodied in either hardware, software, or a combination of hardware and software configured to parse an incoming data packet and/or message from the network element 12 and/or the network node 14 to determine whether to perform a translation of the data packet and/or message and, if a translation is to be performed, what type of translation to perform based on the type of OSS data associated with the data packet and/or message. In an alternative embodiment, the determination of which translation to perform may be made based on the address of the device designated to receive the corresponding data packet and/or message. If a particular type of translation is determined at the protocol determining element 24, the protocol determining element 24 communicates the data packet and/or message to the protocol translation element 26 for a respective translation.

The protocol translation element 26 may be any device or means embodied in either hardware, software, or a combination of hardware and software configured to perform any one of a plurality of protocol translations as determined by the protocol determining element 24. As such, the protocol translation element 26 may be configured to support a selected one of a plurality of protocol translations. Accordingly the protocol translation element 26 may enable communication between the network node 14 and any one of a plurality of different devices of the first network 16 via any particular type of network element 12 or network switching system. Thus, the protocol translation element 26 provides a nonproprietary, low cost, translation service for high speed (e.g., greater than 320 kilobytes per second) universal OSS data services communication.

Figure 3:
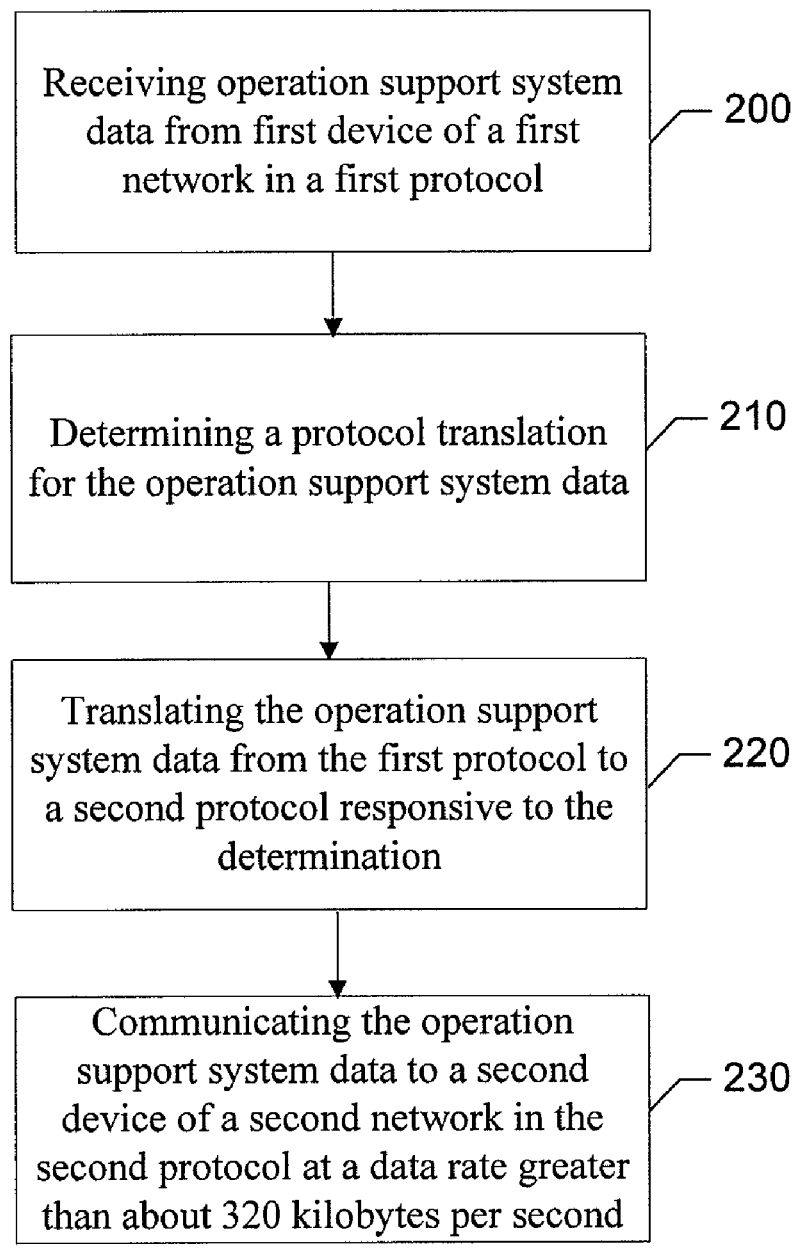
FIG. 3 is a flow chart of a method of providing a universal high speed link for communication of OSS data according to an exemplary embodiment.

FIG. 3 is a flow chart of a method of providing a universal high speed link for communication of OSS data according to an exemplary embodiment. In this regard, the method may include receiving operation support system data from a first device of a first network in a first protocol at operation 200. The operation support system data may relate to, for example, a maintenance related message or a data collection related message. A protocol translation may be determined for the operation support system data at operation 210. In alternative exemplary embodiments, operation 210 could include selecting a translation from the first protocol to the second protocol based on a type of the operation support system data or based on an identifier (e.g., address) of the second device. The protocol translation could be done from the first protocol to any one of a plurality of second protocols different from the first protocol. At operation 220, the operation support system data may be translated from the first protocol to a second protocol responsive to the determination. The method may further include communicating the operation support system data to a second device of a second network in the second protocol at a data rate greater than about 320 kilobytes per second at operation 230. As such, operation 230 may include providing universal communication of the operation support system data to the second device regardless of an origin or manufacture of the second device.

While embodiments have been described above with reference to particular exemplary embodiments, it will be understood that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the embodiments not be limited to the particular embodiments disclosed, but that embodiments will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
   receiving operation support system data from a first device of a first network in any of a plurality of different protocols;
   determining a protocol translation for the operation support system data;
   translating the operation support system data from the any of a plurality of different protocols to a second protocol responsive to the determination; and
   communicating the operation support system data to a second device of a second network in the second protocol at a data rate greater than about 320 kilobytes per second,
   wherein said translating is performed in other than said first network and other than said second network.

2. The method of claim 1, wherein determining the protocol translation comprises selecting a translation from the any of a plurality of different protocols to the second protocol based on a type of the operation support system data.

3. The method of claim 1, wherein determining the protocol translation comprises selecting a translation from the any of a plurality of different protocols to the second protocol based on an identifier of the second device.

4. The method of claim 1, wherein determining the protocol translation comprises selecting a translation from the any of a plurality of different protocols to any one of a plurality of second protocols different from the any of a plurality of different protocols.

5. The method of claim 1, wherein communicating the operation support system data to the second device comprises providing universal communication of the operation support system data to the second device regardless of an origin of the second device.

6. The method of claim 1, wherein receiving the operation support system data comprises receiving one of:
   a maintenance related message; or
   a data collection related message.

7. A computer program product comprising at least one computer-readable storage medium having computer-readable program code portions stored therein, the computer-readable program code portions comprising:
   a first executable portion configured to receive operation support system data from a first device of a first network in any of a plurality of different protocols;
   a second executable portion configured to determine a protocol translation for the operation support system data;
   a third executable portion configured to translate the operation support system data from the any of a plurality of different protocols to a second protocol responsive to the determination; and
   a fourth executable portion communicatively coupled to the first, second and third executable portions and configured to communicate the operation support system data to a second device of a second network in the second protocol at a data rate greater than about 320 kilobytes per second,
   wherein said third executable portion is executed in other than said first network and other than said second network.

8. The computer program product of claim 7, wherein the second executable portion includes instructions for selecting a translation from the any of a plurality of different protocols to the second protocol based on a type of the operation support system data.

9. The computer program product of claim 7, wherein the second executable portion includes instructions for selecting a translation from the any of a plurality of different protocols to the second protocol based on an identifier of the second device.

10. The computer program product of claim 7, wherein the second executable portion includes instructions for selecting a translation from the any of a plurality of different protocols to any one of a plurality of second protocols different from the any of a plurality of different protocols.

11. The computer program product of claim 7, wherein the fourth executable portion includes instructions for providing universal communication of the operation support system data to the second device regardless of an origin of the second device.

12. The computer program product of claim 7, wherein the first executable portion includes instructions for receiving one of:
    a maintenance related message; or
    a data collection related message.

13. An apparatus comprising:
    a processing element configured to receive operation support system data from a first device of a first network in any of a plurality of different protocols;
    a protocol determining element configured to determine a protocol translation for the operation support system data; and
    a protocol translation element configured to translate the operation support system data from the any of a plurality of different protocols to a second protocol for a second network responsive to the determination, said protocol translation element translating said data in other than said first network and other than said second network,
    wherein the processing element is in communication with both the protocol determining element and the protocol translation element and is configured to communicate the operation support system data to a second device of said second network in the second protocol at a data rate greater than about 320 kilobytes per second.

14. The apparatus of claim 13, wherein the protocol translation element is configured to select a translation from the any of a plurality of different protocols to the second protocol based on a type of the operation support system data.

15. The apparatus of claim 13, wherein the protocol translation element is configured to select a translation from the any of a plurality of different protocols to the second protocol based on an identifier of the second device.

16. The apparatus of claim 13, wherein the protocol translation element is configured to select a translation from the any of a plurality of different protocols to any one of a plurality of second protocols different from the first protocol.

17. The apparatus of claim 13, wherein the processing element is configured to provide universal communication of the operation support system data to the second device regardless of an origin of the second device.

18. The apparatus of claim 13, wherein the processing element is configured to receive one of:
    a maintenance related message; or
    a data collection related message.

19. The apparatus of claim 18, wherein the data collection related message is associated with automatic message accounting data.

20. The apparatus of claim 13, wherein the any of a plurality of different protocols is Internet Protocol (IP) and the second protocol is any one of a plurality of protocols corresponding to each of a plurality different types of operation support system data.

21. A computer-implemented method, said method comprising:
    sending, by operation of a computer, data from a first network operating in accordance with any of a plurality of different communication protocols destined for a second network operating in accordance with a second communication protocol; and
    prior to said data being received in said second network, translating, by operation of said computer, said data from said any of said plurality of different communication protocols to said second protocol in a protocol mediator located in other than said first network or said second network.

22. The method of claim 21 further comprising:
    subsequent to said translating, communicating said translated data in said second protocol to said second network at a data rate in excess of a pre-determined data rate from a processing element located in other than said any of a plurality of different protocols or said second network.

23. A computer-implemented method comprising:
    providing, by operation of a computer, a first network having a plurality of different first communication protocols for said first network, each of said first communication protocols operable with a second network;
    receiving, by operation of said computer, operation support system data from a first device of said first network in one of said plurality of different first protocols;
    determining, by operation of said computer, from amongst said plurality of different first protocols a protocol translation for the operation support system data;
    translating, by operation of said computer, the operation support system data from the one first protocol to a second protocol responsive to the determination; and
    communicating, by operation of said computer, the operation support system data to a second device of said second network in the second protocol at a data rate greater than a pre-determined data rate.

* * * * *